(12) United States Patent
Rotem et al.

(10) Patent No.: US 7,563,024 B2
(45) Date of Patent: Jul. 21, 2009

(54) METHOD AND APPARATUS FOR MEASUREMENT OF ELECTRONICS DEVICE SKIN TEMPERATURE

(75) Inventors: Efraim Rotem, Haifa (IL); Rajiv K. Mongia, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 296 days.

(21) Appl. No.: 11/536,541

(22) Filed: Sep. 28, 2006

(65) Prior Publication Data

US 2008/0112463 A1    May 15, 2008

(51) Int. Cl.
*G01K 7/00* (2006.01)
*G01K 13/00* (2006.01)
*G01K 1/14* (2006.01)
*H01C 1/02* (2006.01)

(52) U.S. Cl. ............... 374/183; 374/141; 374/208; 338/258; 338/22 R; 338/25; 338/260

(58) Field of Classification Search ........... 374/183, 374/208, 141; 338/25, 22 R, 258, 260
See application file for complete search history.

(56) References Cited

U.S. PATENT DOCUMENTS

| 6,255,622 B1 * | 7/2001 | May et al. ............... 219/209 |
| 7,059,769 B1 * | 6/2006 | Potega ...................... 374/185 |
| 7,360,945 B2 * | 4/2008 | Kardach et al. ............ 374/141 |
| 2003/0002250 A1 * | 1/2003 | Yin ......................... 361/687 |
| 2003/0220721 A1 * | 11/2003 | Cohen ...................... 700/301 |

* cited by examiner

*Primary Examiner*—Lisa M Caputo
*Assistant Examiner*—Mirellys Jagan
(74) *Attorney, Agent, or Firm*—Schwabe, Williamson & Wyatt, P.C.

(57) ABSTRACT

For some embodiments, skin temperature of a computer system may be determined by using a network of thermistors and conductors. A thermistor may be positioned at an intersection of two conductors. Current may be supplied to a first conductor. Voltage may be measured at a second conductor. Resistance information associated with the thermistor may be determined. Skin temperature may be determined from the resistance information.

20 Claims, 5 Drawing Sheets

METHOD AND APPARATUS FOR MEASUREMENT OF ELECTRONICS DEVICE SKIN TEMPERATURE

FIELD OF THE INVENTION

The present invention relates generally to field of thermal management. More specifically, the present invention relates to methods and apparatus for determining temperature associated with a computer system.

BACKGROUND

Smaller and more powerful electronic components allow for the design and construction of higher performance computer systems, especially portable computer systems (e.g., laptop or notebook computers). A portable computer system may include a base unit and a display unit. The base unit may include an input device (e.g., a keyboard or a touchpad) and a number of electronic components (e.g., processor, disk drive, memory modules, etc.). The display unit may include a liquid crystal display (LCD) and associated electronic components. When in operation, each of these electronic components may generate a certain amount of heat. The heat may cause the skin temperature of the portable computer system to rise. As described herein, the skin temperature of a portable computer system may include the temperature of an exterior area of the portable computer system. The exterior area may be part of the bottom surface or the top surface of the computer system.

One of the limiting factors in portable computer systems and small form factor designs is the skin temperature. The skin temperature may affect the ability for the users to use the portable computer systems on their laps or on their palms for smaller form factor designs. Excessive skin temperature may cause discomfort. Ergonomic limitations do not allow the skin temperature of a portable computer system to increase above a specified temperature such as, for example, 25 degrees Celsius above ambient temperature.

Different techniques may be used to measure the skin temperature of the computer systems with each technique offering different advantages. These techniques may include, for example, using one or more temperature sensors placed in contact with the skin material, using infra-red (IR) absorption, etc. In general, these techniques are based on single point measurement and may require prior knowledge of the hot spot point and may not be applicable with moving hot spot. They also tend to be more expensive to implement. Furthermore, there is often insufficient space on the system board or in the space between hot components and the areas of the computer system that are susceptible to high skin temperatures. As such, solutions that implement IR sensors may not be sufficient.

Computer manufacturers are continuously developing more cost-effective and accurate techniques to measure the skin temperature so that the thermal management may be improved. Improving thermal management may reduce the thermal guard bands, thus providing more opportunities to increase system performance.

BRIEF DESCRIPTION OF THE DRAWINGS

The present invention is illustrated by way of example, and not limitation, in the figures of the accompanying drawings in which like references indicate similar elements and in which.

DETAILED DESCRIPTION

For some embodiments, methods and apparatus to measure skin temperature of a computer system are disclosed. Using a printed network of thermistors on the underside of a portable computer system, the skin temperature may be more accurately determined than techniques that measure the skin temperature at a single location.

Thermal limitations may limit system performance. As the skin temperature of a computer system approaches a guard band, system performance may be reduced to avoid over temperature condition. When the skin temperature is not accurately measured, the system performance may be reduced unnecessarily. Improving the accuracy of skin temperature measurement may enable higher performance in computer systems that have small form factors.

In the following description, for purposes of explanation, numerous specific details are set forth to provide a thorough understanding of the present invention. It will be evident, however, to one skilled in the art that the present invention may be practiced without these specific details. In other instances, well known structures, processes, and devices are shown in block diagram form or are referred to in a summary manner in order to provide an explanation without undue detail.

Computer System

Figure 1:
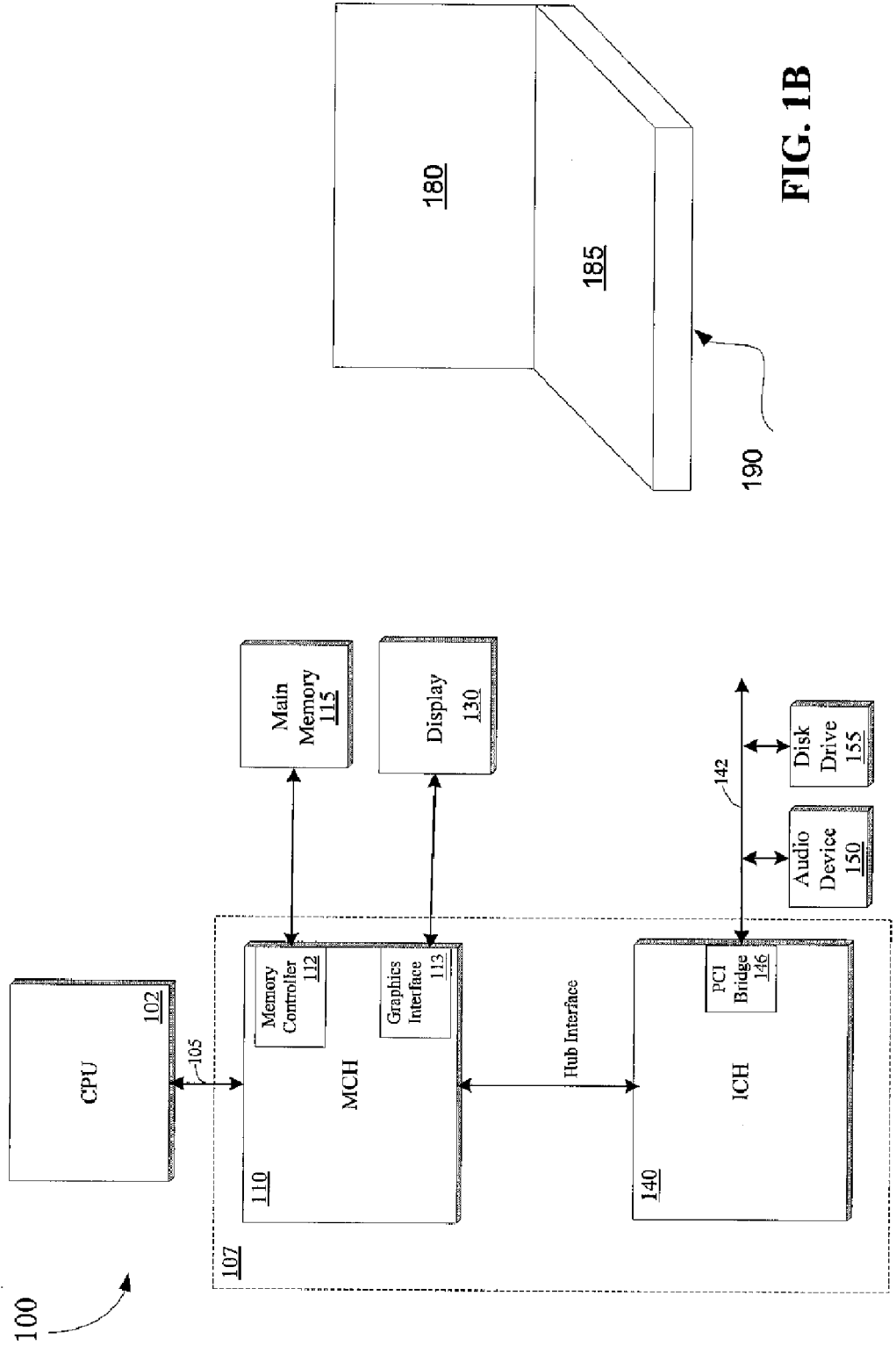
FIG. 1 is a block diagram illustrating an example of a computer system that may be used, in accordance with an embodiment of the invention.

FIG. 1A is a block diagram illustrating an example of a computer system that may be used, in accordance with some embodiments. Computer system 100 may include a central processing unit (CPU) 102 and may receive its power from an electrical outlet or a battery. The CPU 102 and chipset 107 may be coupled to bus 105. The chipset 107 may include a memory control hub (MCH) 110. The MCH 110 may include a memory controller 112 that is coupled to system memory 115. The system memory 115 may store data and sequences of instructions that are executed by the CPU 102 or any other processing devices included in the computer system 100. The MCH 110 may include a graphics interface 113. Display 130 may be coupled to the graphics interface 113. The chipset 107 may also include an input/output control hub (ICH) 140. The ICH 140 is coupled with the MCH 110 via a hub interface. The ICH 140 provides an interface to input/output (I/O) devices within the computer system 100. The ICH 140 may include PCI bridge 146 that provides an interface to PCI bus 142. The PCI bridge 146 may provide a data path between the CPU 102 and peripheral devices. An audio device 150 and a disk drive 155 may be connected to the PCI bus 142. The disk drive 155 may include a storage media to store data and sequences of instructions that are executed by the CPU 102 or any other processing devices included in the computer system 100. Although not shown, other devices (e.g., keyboard, mouse, etc.) may also be connected to the PCI bus 142.

For some embodiments, the computer system 100 may be a portable computer system such as, for example, a notebook or a lap top computer system. An example is illustrated in FIG. 1B. The computer system 100 may include a lid unit 180 and a base unit 185 in a clam shell form factor. The lid unit 180 may include the display 130, and the base unit 185 may include at least some of the electronic components (e.g., CPU 102, disk drive 155, etc.) described above. When the computer system 100 is in operation, some of these electronic components may generate heat.

Skin Temperature

Bottom surface 190 of the base unit 185 includes an exterior area (not shown) and an interior area (not shown). The interior area may be the area that is closest to the electronic components (e.g., CPU 102, chipset 107, etc.). The exterior area may be the surface that is more likely to be in contact with a user. For some embodiments, the skin temperature may include the temperature of the internal area of the bottom surface 190. It is assumed that there is minor variation between the temperatures of the internal area and the external area of the bottom surface 190, if any, or if different, that these temperatures may be correlated to a reasonable degree of confidence.

Printed Network of Thermistors

Figure 2:
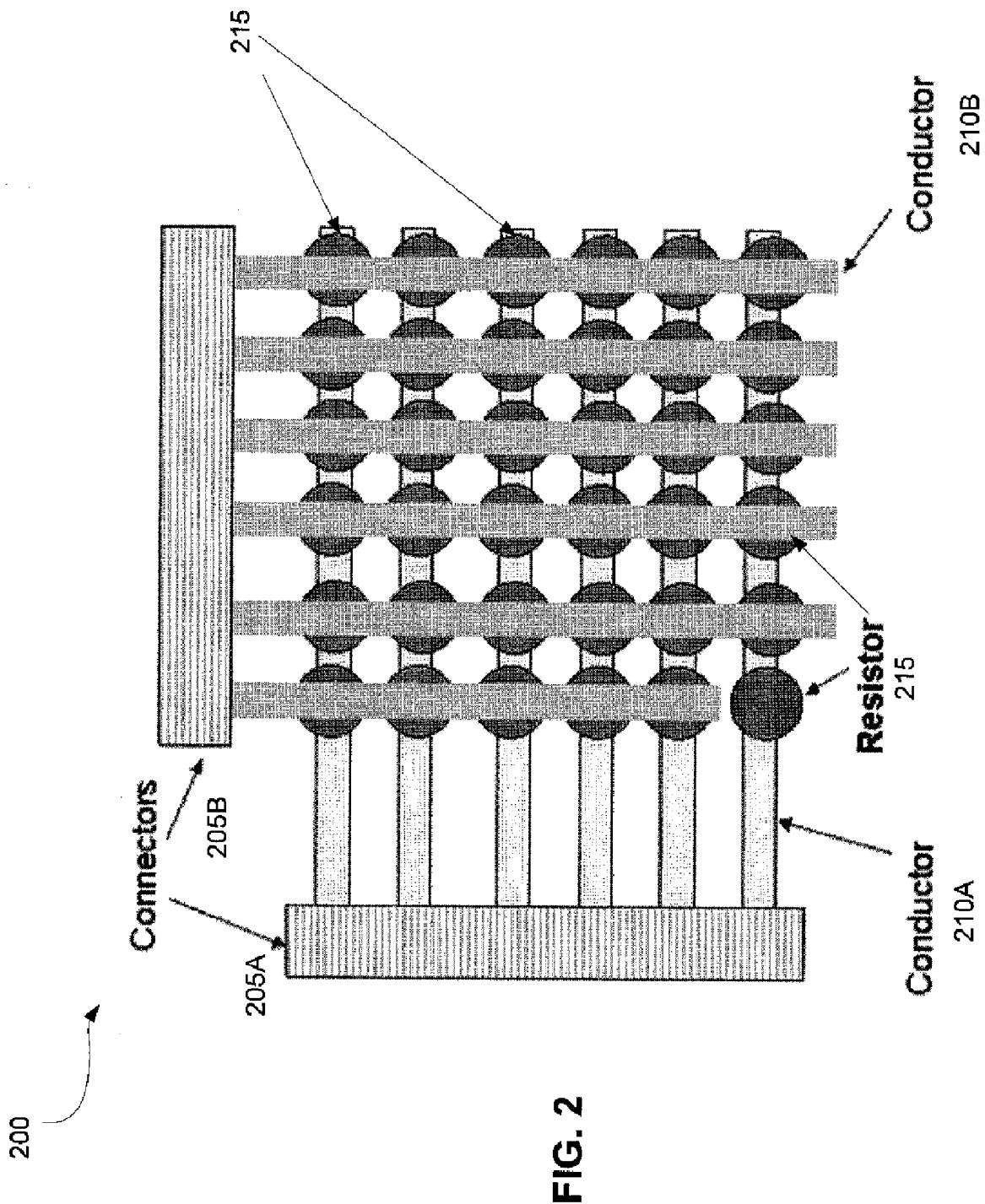
FIG. 2 is a diagram that illustrates an example of a network of thermistors and conductors, in accordance with some embodiments.

FIG. 2 is a diagram that illustrates an example of a network of thermistors and conductors, in accordance with some embodiments. For some embodiments, a network that includes a set of thermistors coupled to multiple conductors may be used to measure the skin temperature. The thermistors may be electronic components that vary resistance in different temperatures. There are two types of thermistors. Positive temperature coefficient (PTC) thermistors increase resistance with temperature. The increase is usually a non-linear change with sharp change at certain temperature. Negative temperature coefficient (NTC) thermistors also increase resistance with temperature, but the change is more linear. PTC and NTC thermistors are known to one skilled in the art. For some embodiments, the NTC thermistors may be used in the printed network 200.

For some embodiments, the set of thermistors may be arranged in a matrix forming one layer (referred to herein as a thermistor layer). The thermistor layer may be positioned in between two layers of conductors. In the current example, network 200 is illustrated to include a thermistor layer 215 arranged as a 6 rows by 6 columns matrix for a total of 36 thermistors. The thermistor layer 215 may be positioned in-between a first layer of parallel conductors 210A (referred to herein as a first conductor layer) oriented in one direction and a second layer of parallel conductors 210B (referred to herein as a second conductor layer) oriented in another direction. Each conductor in the first conductor layer 210A may be in contact with a row of thermistors in the thermistor layer 215. Similarly, each conductor in the second conductor layer 210B may be in contact with a column of thermistors in the thermistor layer 215. Thus, at each intersection of a conductor in the first conductor layer 210A and a conductor in the second conductor layer 210B, there is an associated thermistor from the thermistor layer 215. Although the network 200 described in this example includes a 6×6 matrix of thermistors, it may be possible to adjust the size of the matrix and of the network to fit the needs of the different applications.

A first connector 205A may be used to form contact points with the conductors in the first conductor layer 210A. A second connector 205B may be used to form contact points with the conductors in the second conductor layer 210B. Different types of connectors may be used. For some embodiments, the two connectors 205A and 205B may be zebra, springs, or flex type. For some embodiments, the contact points with the conductors may be molded into the interior area of the bottom surface of the computer system and used as connectors. The connectors 205A and 205B may be coupled to the system board via any connection techniques. The connection to the system board may be necessary to supply an input current to one connector layer. The connection to the system board may also be necessary to measure the voltage from another connector layer so that resistance information may be analyzed and associated temperature may be determined. Although not shown, the supply of the current and the determination of the temperature may be performed by a controller such as, for example, the CPU 102.

For some embodiments, the network 200 including the thermistor layer 215 may be printed on the interior surface of the computer system 100. This may enable the current techniques to be implemented when there is insufficient space on the system board or insufficient space between the hot components and the interior surface of the computer system. Furthermore, printed thermistors typically have good stability in temperature which is desirable in resistive applications. For some embodiments, an isolating material may be used between the interior area and the network 200.

Temperature Measurement

Figure 3:
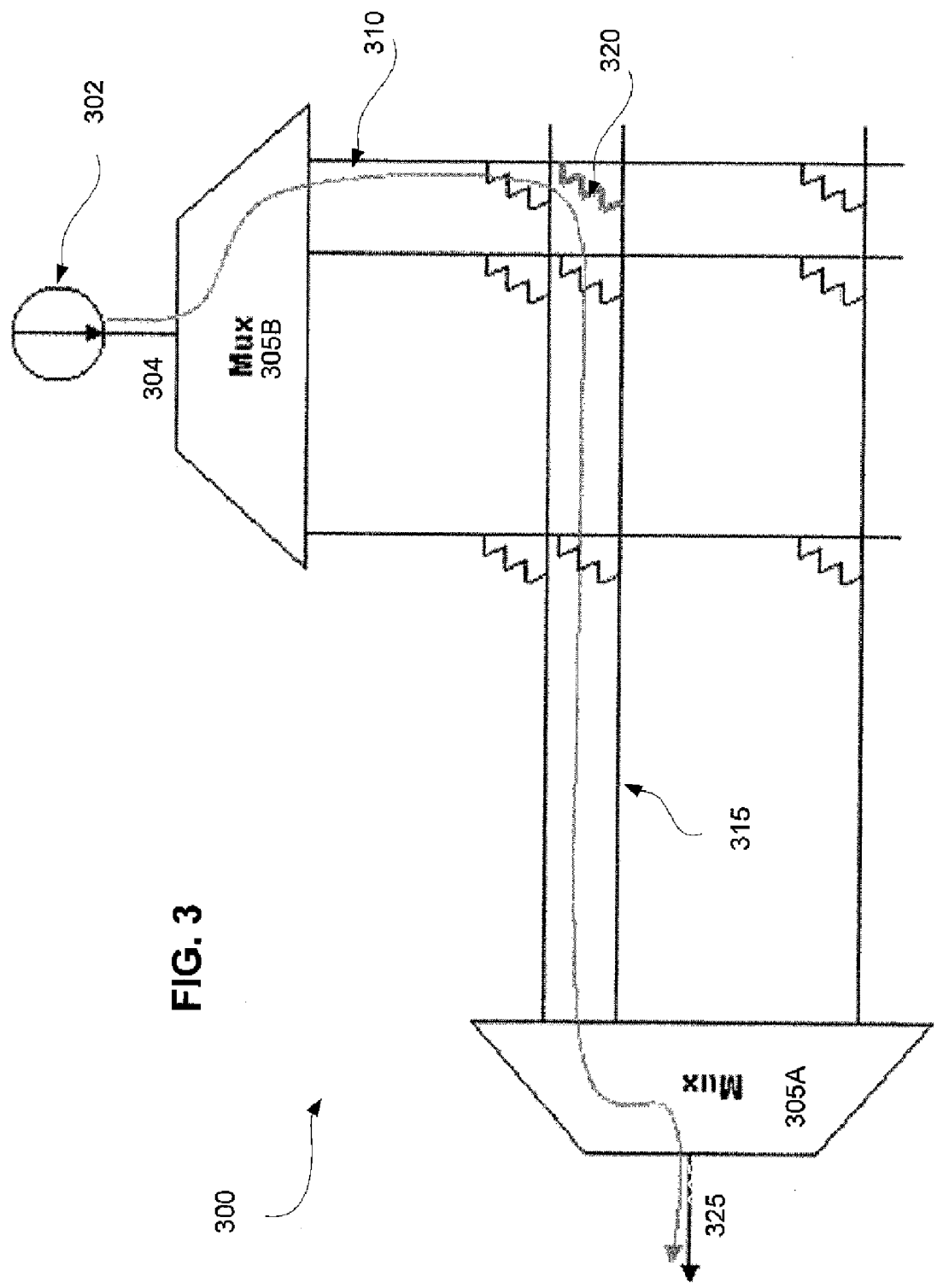
FIG. 3 illustrates one example of a control logic that may be used to perform temperature measurement, according to some embodiments.

FIG. 3 illustrates one example of a control logic that may be used to perform temperature measurement, according to some embodiments. Control logic 300 may correspond to the network 200 illustrated in FIG. 2. The control logic 300 may include a first multiplexer (or mux) 305A coupled to the first conductor layer 210A, and a second analog mux 305B coupled to the second conductor layer 210B. Each of the mux 305A and mux 305B may be an analog mux.

For some embodiments, temperature at an intersection between two conductors (each from a different conductor layer) may be measured by using resistance measurement of a thermistor associated with that intersection. This may be performed by driving a current to a conductor belonging to one conductor layer and picking up the current from a conductor belonging to another conductor layer, resulting in a sampling of the resistance at the intersection of the two conductors. This is illustrated in the control logic example in FIG. 3 where current 302 is applied to the input end 304 of mux 305B. The current 302 is supplied to conductor 310 and across thermistor 320 (along the indicated directional path) which is in contact with conductor 315. The conductor 315 is coupled to the analog mux 305A which enables the current 302 to be picked up by the mux 305A. This may enable the resistance of the thermistor 320 to be measured at the output end 325 of the mux 305A. Note that the mux 305A and the mux 305B may be coupled to the first connector 205A and the second connector 205B (illustrated in FIG. 2), respectively.

For some embodiments, the control logic 300 may include logic to scan all of the thermistors in the thermistor layer 215 and measure each of the associated resistors. This may enable the skin temperature to be measured more accurately since temperature is being read and analyzed at different locations rather than at a single location. Different techniques may be used to perform the scanning of the thermistors and to collect resistance data. Techniques that interpolate scattered data may also be used.

It may be possible that the thermistors used in a printed network (such as illustrated in the examples in FIGS. 2-3) may suffer from resistance value inaccuracy. For one embodiment, the resistance inaccuracy may be reduced by using resistor trimming. For example, laser trimming and ink jet technologies available to trim the resistance value may be used to improve accuracy. For some embodiments, other sensors on the system board that have good absolute accuracy may be used for relative measurements. An interpolation algorithm may use these sensors as reference point to offset the temperature data calculated based on the resistance information received from the network. For some other embodiments, accuracy may be improved by performing offset calibration during manufacturing or boot time and storing values in non-volatile memory. Software based calibration may help reduce manufacturing cost as compared to hardware based trimming solutions.

Process

Figure 4:
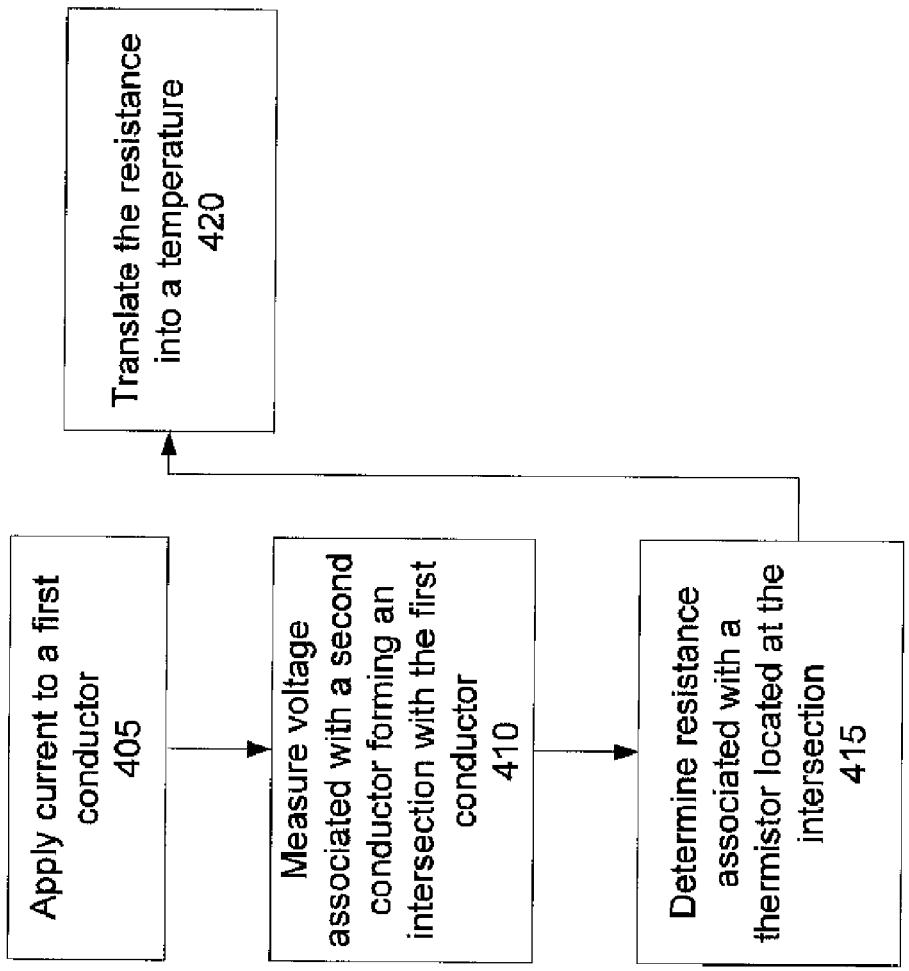
FIG. 4 is a flow diagram illustrating an example of a process used to determine temperature values, in accordance with one embodiment.

FIG. 4 is a flow diagram illustrating an example of a process that may be used to determine temperature values, in accordance with some embodiments. The process may be performed for each intersection of a row and a column. For example, the process may start by selecting an intersection of the first row and the first column and continue to the intersection of the first row and the last column. The process may then move on to the second row and the first column and so on until the intersection of the last row and the last column. A network that may comprise of rows and columns of conductors may be used. At each intersection of a row and a column, there may be a thermistor. For example, the network may be similar to the network described in FIG. 2. The network may be printed on an interior area of a bottom surface or of a top surface of a portable computer system.

At block 405, for a selected intersection, a current may be sent out to the conductor of the associated row. At block 410, a voltage may be read from the conductor of the associated column. At block 415, using the voltage information, resistance associated with the selected intersection may be determined. At block 420, the resistance may be translated into a temperature value which may be stored. Any translation techniques may be used. This process may be repeated until a temperature value associated with each intersection is determined and stored.

Figure 5:
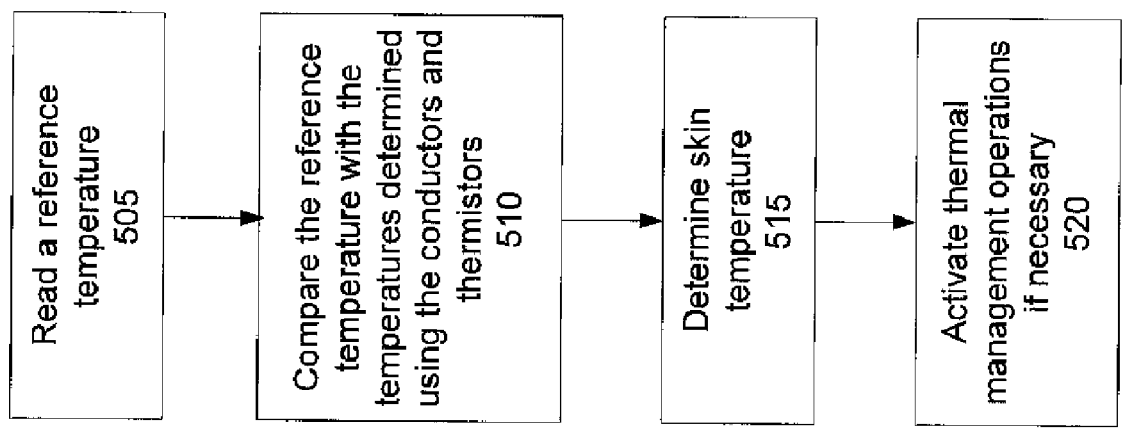
FIG. 5 illustrates an example of a process that may be used to calibrate the temperatures, in accordance with some embodiments.

FIG. 5 illustrates an example of a process that may be used to calibrate the temperatures, in accordance with some embodiments. For some embodiments, a reference temperature value may be used to calibrate the temperatures determined from the network of conductors described above. The reference temperature may be predetermined. For example, it may be a known controlled production ambient temperature. For some embodiments, the reference temperature may be determined from a reference sensor. The reference temperature may be stored in a storage area such as, for example, a non-volatile memory area of the computer system.

At block 505, the reference temperature may be read from a memory location. At block 510, the reference temperature may be used to compare with the different stored temperature values. Based on the comparisons, areas of high skin temperature may be determined, as shown in block 515. Depending on the skin temperature, appropriate thermal management operations may be performed, as shown in block 520. For example, when the skin temperature exceeds a threshold, techniques to reduce heat generation of one or more electronic components in the computer system may be performed.

Although the present invention has been described with reference to specific exemplary embodiments, it will be evident that various modifications and changes may be made to these embodiments without departing from the broader spirit and scope of the invention as set forth in the claims. For example, the techniques described above may be used to determine the skin temperature of the bottom surface or of the top surface of a computer system. Accordingly, the specification and drawings are to be regarded in an illustrative rather than a restrictive sense.

What is claimed is:

1. A system, comprising:
a surface of a portable computer system that includes an exterior area and an interior area; and
a printed network of thermistors printed on the interior area of the surface, the printed network of thermistors including a plurality of thermistors arranged in a matrix, wherein the plurality of thermistors form a thermistor layer that is positioned between a first layer of parallel conductors oriented in one direction and a second layer of parallel conductors oriented in another direction, wherein each of the plurality of thermistors is positioned at an intersection of a first conductor in the first layer and a second conductor in the second layer, wherein temperature of a location on the exterior area and closest to one of the plurality of thermistors is determined by measuring resistance associated with the one of the plurality of thermistors after a current is supplied to the first conductor.

2. The system of claim 1, wherein the network is coupled to a system board.

3. The system of claim 1, wherein the first conductor layer is coupled to a first connector, and wherein the second conductor layer is coupled to a second connector.

4. The system of claim 3, wherein the first connector or the second connector is implemented using one of zebra, springs, or flex connector type.

5. The system of claim 1, further comprising a controller coupled to the network and configured to supply the current to the first conductor.

6. The system of claim 5, wherein the resistance associated with the thermistor is measured by determining a voltage associated with the second conductor.

7. The system of claim 6, wherein the temperature of the location is compared against a reference temperature.

8. The system of claim 7, wherein the resistance associated with the thermistor is adjusted to improve accuracy.

9. The system of claim 8, wherein the resistance associated with each of the plurality of thermistors is adjusted using trimming or calibration.

10. An apparatus, comprising:
a first conductor layer including a first plurality of parallel conductors oriented in a first direction, wherein the first conductor layer is to receive a current to facilitate a temperature measurement;
a second conductor layer including a second plurality of parallel conductors oriented in a second direction substantially perpendicular to the first direction, wherein the second conductor layer is to receive the current from the first conductor layer and provide a voltage to facilitate the temperature measurement; and
a thermistor layer, coupled to the first conductor layer and the second conductor layer including a plurality of thermistors arranged in a matrix, wherein each of the plurality of thermistors is positioned at an intersection between a conductor from the first conductor layer and a conductor from the second conductor layer, wherein resistance associated with the thermistor is determined after the current is supplied to the first conductor and voltage is measured at the second conductor, and wherein the resistance is analyzed to determine a temperature.

11. The apparatus of claim 10, wherein the thermistor layer, the first conductor layer, and the second conductor layer form a network, and wherein the network is printed on an interior area of a surface of a computer system.

12. The apparatus of claim 11, wherein the first conductor layer is coupled to a first connector and the second conductor layer is coupled to a second connector.

13. The apparatus of claim 12, wherein the first connector or the second connector is implemented using a zebra, springs, or flex connector type.

14. The apparatus of claim 13, wherein the first connector and the second connector is coupled to a system board, and wherein current is to be supplied to conductors in the first conductor layer from the system board.

15. The apparatus of claim 14, wherein temperature of the surface of the computer system is determined using the network and a reference temperature.

16. The apparatus of claim 15, wherein thermal management operations are activated when the temperature of the surface exceeds a threshold.

17. A method, comprising:
 selecting, via a controller, a first intersection of a plurality of intersections, wherein the plurality of intersections are formed via a first conductor layer including a first plurality of parallel conductors positioned in a direction overlapping with a second conductor layer including a second plurality of parallel conductors position in a direction, the first and second conductor layers forming a matrix;
 applying a current to the first intersection of the plurality of intersections; and
 determining a temperature associated with a position of the intersection based on a voltage at the second conductor layer, wherein a thermistor positioned at the intersection is configured to provide a voltage drop across the intersection and the voltage drop corresponds to the temperature.

18. The method of claim 17, further comprising applying another current to a second intersection of the plurality of intersections, and determining a temperature associated with a position of the second intersection, wherein the position of the first intersection is different than the position of the second intersection.

19. The method of claim 17, wherein the voltage at the second conductor is used to determine a resistance associated with the thermistor.

20. The method of claim 19, wherein the resistance is analyzed to determine the temperature.

\* \* \* \* \*

UNITED STATES PATENT AND TRADEMARK OFFICE
CERTIFICATE OF CORRECTION

| | | |
|---|---|---|
| PATENT NO. | : 7,563,024 B2 | Page 1 of 1 |
| APPLICATION NO. | : 11/536541 | |
| DATED | : July 21, 2009 | |
| INVENTOR(S) | : Rotem et al. | |

It is certified that error appears in the above-identified patent and that said Letters Patent is hereby corrected as shown below:

Column 7
Line 25, "17. ...positioned in a direction..." should read --17. ...positioned in a first direction...--.

Column 8
Lines 2-3. "17. ...position in a direction:..." should read --17. ...positioned in a second direction...--.
Line 3, "17. ...the first and second conductor layers...;..." should read --17. ..., the first and second conductors layers...;...--.

Signed and Sealed this
Thirty-first Day of May, 2011

David J. Kappos
*Director of the United States Patent and Trademark Office*